(12) United States Patent
Ramatchandirane

(10) Patent No.: US 10,484,359 B2
(45) Date of Patent: *Nov. 19, 2019

(54) DEVICE-LEVEL AUTHENTICATION WITH UNIQUE DEVICE IDENTIFIERS

(71) Applicant: Confia Systems, Inc., Mountain View, CA (US)

(72) Inventor: Nadaradjane Ramatchandirane, Mountain View, CA (US)

(73) Assignee: Confia Systems, Inc., Mountain View, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/457,135

(22) Filed: Mar. 13, 2017

(65) Prior Publication Data

US 2017/0302656 A1 Oct. 19, 2017

Related U.S. Application Data

(63) Continuation-in-part of application No. 14/852,284, filed on Sep. 11, 2015, now Pat. No. 9,602,292.

(Continued)

(51) Int. Cl.
*G06F 21/00* (2013.01)
*H04L 29/06* (2006.01)
(Continued)

(52) U.S. Cl.
CPC ........ *H04L 63/0823* (2013.01); *G06F 21/305* (2013.01); *G06F 21/44* (2013.01);
(Continued)

(58) Field of Classification Search
CPC ............. H04L 63/0823; H04L 63/0876; H04L 9/3268; H04L 9/3247; H04L 9/3263;
(Continued)

(56) References Cited

U.S. PATENT DOCUMENTS 6,175,921 B1 1/2001 Rosen
6,223,291 B1 4/2001 Puhl et al.
(Continued)

FOREIGN PATENT DOCUMENTS

EP 1 874 014 1/2008
WO 2001/039072 5/2001
(Continued)

OTHER PUBLICATIONS

James Cortez, David A. Shamma, Linghan Cai; "Device communication: a multi-modal communication platform for internet connected televisions"; Jul. 2012; EuroITV '12: Proceedings of the 10th European Conference on Interactive TV and Video Publisher: ACM; pp. 19-26 (Year: 2012).*

(Continued)

*Primary Examiner* — Kendall Dolly
*Assistant Examiner* — Courtney D Fields
(74) *Attorney, Agent, or Firm* — McDonnell Boehnen Hulbert & Berghoff LLP

(57) ABSTRACT

An embodiment may include transmitting a manufacturer security certificate to a provisioning server device, and establishing, with the provisioning server device, a secure connection based on the manufacturer security certificate. The embodiment may also involve transmitting, over the secure connection, device data that characterizes the client device, and receiving, over the secure connection, a server security certificate. The embodiment may further include obtaining a unique client device identifier. The embodiment may additionally include, possibly based on the server security certificate and the unique client device identifier, accessing protected information available to a particular pre-validated server device.

19 Claims, 9 Drawing Sheets

Related U.S. Application Data

(60) Provisional application No. 62/282,069, filed on Jul. 25, 2015.

(51) Int. Cl.

| | | |
|---|---|---|
| *H04L 9/30* | (2006.01) | |
| *H04L 9/14* | (2006.01) | |
| *H04L 9/32* | (2006.01) | |
| *G06F 21/30* | (2013.01) | |
| *G06F 21/44* | (2013.01) | |
| *G06F 21/62* | (2013.01) | |
| *G06F 21/73* | (2013.01) | |
| *G06F 21/71* | (2013.01) | |
| *G06F 21/72* | (2013.01) | |
| *H04L 29/08* | (2006.01) | |

(52) U.S. Cl.
CPC .......... *G06F 21/6218* (2013.01); *G06F 21/73* (2013.01); *H04L 9/14* (2013.01); *H04L 9/30* (2013.01); *H04L 9/3247* (2013.01); *H04L 9/3263* (2013.01); *H04L 9/3268* (2013.01); *H04L 9/3273* (2013.01); *H04L 63/0869* (2013.01); *H04L 63/0876* (2013.01); *H04L 63/166* (2013.01)

(58) Field of Classification Search
CPC . H04L 9/14; H04L 9/30; H04L 63/166; H04L 63/0869; G06F 21/305; G06F 21/73; G06F 21/6218; G06F 21/44
See application file for complete search history.

(56) References Cited

U.S. PATENT DOCUMENTS

| 6,584,309 | B1 | 6/2003 | Whigham |
| 6,782,080 | B2 | 8/2004 | Leivo et al. |
| 7,203,657 | B1 | 4/2007 | Noam |
| 7,213,742 | B1 | 5/2007 | Birch et al. |
| 7,353,208 | B1 | 4/2008 | Stambaugh |
| 7,458,510 | B1 | 12/2008 | Zhou |
| 7,693,799 | B2 | 4/2010 | Park |
| 7,770,786 | B1 | 8/2010 | Birch et al. |
| 8,205,240 | B2 | 6/2012 | Ansari et al. |
| 8,259,175 | B2 | 9/2012 | Bobbitt et al. |
| 8,280,351 | B1 | 10/2012 | Ahmed et al. |
| 8,332,323 | B2 | 12/2012 | Stals et al. |
| 8,380,177 | B2 | 2/2013 | Laracey |
| 8,490,868 | B1 | 7/2013 | Kropf et al. |
| 8,548,908 | B2 | 10/2013 | Friedman |
| 8,548,912 | B2 | 10/2013 | Cincera |
| 8,632,000 | B2 | 1/2014 | Laracey |
| 8,645,273 | B2 | 2/2014 | Antao et al. |
| 8,738,177 | B2 | 5/2014 | Van Ooyen et al. |
| 2002/0052754 | A1 | 5/2002 | Joyce et al. |
| 2002/0128925 | A1* | 9/2002 | Angeles ............... G06F 11/3414 705/26.1 |
| 2002/0147658 | A1 | 10/2002 | Kwan |
| 2002/0147913 | A1 | 10/2002 | Lun Yip |
| 2003/0072027 | A1 | 4/2003 | Haines et al. |
| 2003/0126076 | A1 | 7/2003 | Kwok et al. |
| 2004/0006713 | A1 | 1/2004 | Minemura |
| 2004/0059925 | A1 | 3/2004 | Benhammou et al. |
| 2004/0098625 | A1 | 5/2004 | Lagadec et al. |
| 2005/0102233 | A1 | 5/2005 | Park et al. |
| 2005/0108158 | A1 | 5/2005 | Prisant |
| 2005/0149740 | A1 | 7/2005 | Kotzin et al. |
| 2006/0020540 | A1 | 1/2006 | Cramer |
| 2006/0100966 | A1 | 5/2006 | Park |
| 2006/0155855 | A1 | 7/2006 | Hamai |
| 2006/0174018 | A1 | 8/2006 | Zhu et al. |
| 2007/0079115 | A1 | 4/2007 | Kresina |
| 2007/0255662 | A1 | 11/2007 | Tumminaro |
| 2008/0004894 | A1 | 1/2008 | Son et al. |
| 2008/0052091 | A1 | 2/2008 | Vawter |
| 2008/0108322 | A1 | 5/2008 | Upp |
| 2008/0154735 | A1 | 6/2008 | Carlson |
| 2008/0255947 | A1 | 10/2008 | Friedman |
| 2009/0055261 | A1 | 2/2009 | Yeh et al. |
| 2009/0055319 | A1 | 2/2009 | Raheman |
| 2009/0106548 | A1 | 4/2009 | Arditti et al. |
| 2009/0144194 | A1 | 6/2009 | Dickelman |
| 2009/0259534 | A1 | 10/2009 | Utter et al. |
| 2009/0306819 | A1 | 12/2009 | Insolia et al. |
| 2010/0009681 | A1 | 1/2010 | Schneyer et al. |
| 2010/0145819 | A1 | 6/2010 | Park |
| 2011/0086668 | A1 | 4/2011 | Patel |
| 2011/0188701 | A1 | 8/2011 | Bobbitt et al. |
| 2011/0251910 | A1 | 10/2011 | Dimmick |
| 2011/0276803 | A1 | 11/2011 | Bender et al. |
| 2012/0029691 | A1 | 2/2012 | Mockus et al. |
| 2012/0089839 | A1 | 4/2012 | Qiu et al. |
| 2012/0162538 | A1 | 6/2012 | Dixon et al. |
| 2012/0290415 | A1 | 11/2012 | Itwaru |
| 2012/0293661 | A1 | 11/2012 | Bobbitt et al. |
| 2013/0054395 | A1 | 2/2013 | Cyr et al. |
| 2013/0091059 | A1 | 4/2013 | Stals et al. |
| 2013/0124396 | A1 | 5/2013 | Loff |
| 2013/0124413 | A1 | 5/2013 | Itwaru |
| 2013/0132217 | A1 | 5/2013 | Yahn et al. |
| 2013/0208879 | A1 | 8/2013 | Rosenhaft et al. |
| 2013/0238455 | A1 | 9/2013 | Laracey |
| 2013/0246203 | A1 | 9/2013 | Laracey |
| 2013/0311313 | A1 | 11/2013 | Laracey |
| 2013/0317928 | A1 | 11/2013 | Laracey |
| 2013/0346299 | A1 | 12/2013 | Grinberg et al. |
| 2014/0032412 | A1 | 1/2014 | Park et al. |
| 2014/0067677 | A1 | 3/2014 | Ali et al. |
| 2014/0074714 | A1 | 3/2014 | Melone et al. |
| 2014/0164243 | A1 | 6/2014 | Aabye et al. |
| 2014/0201084 | A1 | 7/2014 | Dagenais et al. |
| 2014/0214670 | A1 | 7/2014 | McKenna |
| 2015/0222621 | A1* | 8/2015 | Baum ................. H04W 4/70 726/9 |
| 2015/0350196 | A1* | 12/2015 | Toyonaga ........... H04L 63/0876 713/156 |

FOREIGN PATENT DOCUMENTS

| WO | 2003/023644 | 3/2003 | |
| WO | 2004/114168 | 12/2004 | |
| WO | 2008/127967 | 10/2008 | |
| WO | 2011/092044 | 8/2011 | |
| WO | 2012/151660 | 11/2012 | |
| WO | 2012/151684 | 11/2012 | |
| WO | 2013/078083 | 5/2013 | |
| WO | 2013/155627 | 10/2013 | |
| WO | WO-2017165828 A1 * | 9/2017 | ............. G06F 21/33 |

OTHER PUBLICATIONS

Office Action dated May 16, 2018, issued in connection with U.S. Appl. No. 14/295,516, filed Jun. 4, 2014, pp. 1-11.

Byndl [online]. "How It Works," 2014, [Retrieved on May 8, 2014]. Retrieved from the Internet: httn://www.byndl.com/how_it_works. html, 1 page.

Flashiz [online]. "The universal mobile payments," 2014, [Retrieved on May 8, 2014]. Retrieved from the Internet: http://www.flashiz. com/faq/, 8 pages.

Shopkick [online]. "What the press is saying," 2014, [Retrieved on May 8, 2014]. Retrieved from the Internet: http://www.shopkick. com/press, 2 pages.

South China Morning Post, Companies' [online]. "Tencent, Alibaba open mobile payments battle via vending machines," Oct. 9, 2013. [Retrieved on May 8, 2014]. Retrieved from the Internet: http:// www.scmp.com/business/companies/article/1327536/tencent-alibaba-open-mobile-pa, 4 pages.

TechinAsia [online]. "Ubox App + Vending Machines = Mobile Payments for Drinks and Snacks in China," Sep. 6, 2011. [Retrieved on May 8, 2014]. Retrieved from the Internet: URL: http://www. tchinasia.com/ubox-app-vending-machines/. 4 pages.

(56) References Cited

OTHER PUBLICATIONS

Vimeo [online]. "Flashiz—Restaurant ES," 2014, [Retrieved on May 8, 2014]. Retrieved from the Internet: http://vimeo.com/75209068, 2 pages.

YouTube [online]. "Demo—Square Card Reader from Squareup.com," Oct. 27, 2010, [Retrieved on May 8, 2014]. Retrieved from the Internet: http://youtube.com/watch?v-cCMdtfnpolg, 3 pages.

YouTube [online]. "Shopkick—Get Treated Special Again While You Shop," Dec. 20, 2011, [Retrieved on May 8, 2014]. Retrieved from the Internet: http://www.youtube.com/watch?v-2uixneqbqkl, 3 pages.

Lewis, Ira "Logistics and Electronic Commerce: An Interorganizational Systems Perspective," Transportation J., 2001, pp. 5-13, vol. 40, No. 4.

Fomichov et al., "Cognitonics as a new science and its significance for informatics and information society," Informatica, 2006, pp. 387-398, vol. 30.

The Independent [online]. "Pay for vending machine snacks using cell phone," Sep. 13, 2011, [Retrievd on May 8, 2014]. Retrieved from the internet: URL:http://www.independent.co.uk/life-style/pay-for-vending-machine-snacks-using-cell-phone-, 8 pages.

Office Action dated Jul. 28, 2014, issued in connection with U.S. Appl. No. 14/295,516, filed Jun. 4, 2014, 10 pages.

Office Action dated Mar. 1, 2016, issued in connection with U.S. Appl. No. 14/295,516, filed Jun. 4, 2014, 11 pages.

Final Office Action dated Feb. 5, 2015, issued in connection with U.S. Appl. No. 14/295,516, filed Jun. 4, 2014, 15 pages.

Office Action dated Jan. 4, 2016, issued in connection with U.S. Appl. No. 14/920,137, filed Oct. 22, 2015, 12 pages.

Final Office Action dated Aug. 29, 2016, issued in connection with U.S. Appl. No. 14/295,516, filed Jun. 4, 2014, 15 pages.

Final Office Action dated Jul. 14, 2016, issued in connection with U.S. Appl. No. 14/920,137, filed Oct. 22, 2015, 11 pages.

Notice of Allowance dated Nov. 8, 2016, issued in connection with U.S. Appl. No. 14/920,137, filed Oct. 22, 2015, 9 pages.

\* cited by examiner

DEVICE-LEVEL AUTHENTICATION WITH UNIQUE DEVICE IDENTIFIERS

CROSS-REFERENCE TO RELATED APPLICATIONS

This application is a continuation-in-part of and claims priority to U.S. patent application Ser. No. 14/852,284, filed Sep. 11, 2015, which is hereby incorporated by reference in its entirety. U.S. patent application Ser. No. 14/852,284 claims priority to U.S. provisional patent application No. 62/282,069, filed Jul. 25, 2015, which is also hereby incorporated by reference in its entirety.

BACKGROUND

Recent years have seen explosive growth of Internet-connected devices. Once limited to just personal computers and servers, now Internet connectivity is supported by printers, media devices (e.g., stereos, televisions, DVD players), mobile computing devices (e.g., cell phones, tablets), health-monitoring equipment (e.g., fitness trackers), household automation and monitoring devices (e.g., "smart" thermostats and locks), network-enabled kiosks (e.g., parking meters, vending machines), industrial control and monitoring devices (e.g., various types of sensors), connected cards, and so on. Many of these devices primarily conduct machine-to-machine transactions with server devices on the Internet. As such, they may need to be provisioned with a user's credentials, for instance a userid and password, before being fully authenticated and functional. Not only does this add complexity and user confusion to the device setup process, it also results in the user possibly sharing his or her credentials with multiple entities. As a result, the likelihood that the user's credentials are compromised increases accordingly. Given that billions of low-cost Internet-connected devices are expected to be deployed in the future, it is desirable to be able to provide inexpensive, automatic, secure provisioning and authentication technologies for these devices.

SUMMARY

Unlike previous technologies, the embodiments herein focus on device-level authentication rather than user-level authentication. This device-level authentication may involve creation of a unique client device identifier that is securely associated with a particular client device.

Accordingly, a first example embodiment may involve transmitting, by a client device, a manufacturer security certificate to a provisioning server device. The manufacturer security certificate may be associated with a manufacturer of the client device. The first example embodiment may also involve establishing, between the client device and the provisioning server device, a secure connection. The secure connection may be established based on the manufacturer security certificate. The first example embodiment may further involve transmitting, by the client device over the secure connection, device data that characterizes the client device, as well as receiving, by the client device over the secure connection, a server security certificate. The server security certificate may identify secure communication parameters of one or more of pre-validated server devices. The first example embodiment may additionally involve obtaining, by the client device, a unique client device identifier. Possibly based on the server security certificate and the unique client device identifier, the client device may access protected information available to a particular pre-validated server device.

A second example embodiment may involve receiving, by a provisioning server device, a manufacturer security certificate of a client device. The manufacturer security certificate may be associated with a manufacturer of the client device. The second example embodiment may also involve establishing, between the client device and the provisioning server device, a secure connection. The secure connection may be established based on the manufacturer security certificate. The second example embodiment may further involve receiving, by the provisioning server device over the secure connection, device data that characterizes the client device. The second example embodiment may additionally involve transmitting, by the provisioning server device over the secure connection, a server security certificate. The server security certificate may identify secure communication parameters of one or more pre-validated server devices. The second example embodiment may also involve obtaining, by the provisioning server device, a representation of a unique client device identifier. The unique client device identifier may be associated with the client device. Possibly based on the representation of the unique client device identifier, the provisioning server device may register the client device. The registration may associate the representation of the unique client device identifier with policies that allow the client device to securely access, by way of the secure communication parameters, protected information available to the one or more pre-validated server devices.

In the first and second example embodiments, accessing the protected information may involve establishing, between the client device and the particular pre-validated server device, a second secure connection. The second secure connection may be established based on the server security certificate. Accessing the protected information may also involve transmitting, by the client device over the second secure connection, a representation of the unique client device identifier, as well as receiving, by the client device over the second secure connection, the protected information.

In a third example embodiment, an article of manufacture may include a non-transitory computer-readable medium, having stored thereon program instructions that, upon execution by a computing device, cause the computing device to perform operations in accordance with the first example embodiment and/or the second example embodiment.

In a fourth example embodiment, a computing device may include at least one processor, as well as data storage and program instructions. The program instructions may be stored in the data storage, and upon execution by the at least one processor, cause the computing device to perform operations in accordance with the first example embodiment and/or the second example embodiment.

In a fifth example embodiment, a system may include various means for carrying out each of the operations of the first example embodiment and/or the second example embodiment.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

1. Example Computing Devices and Cloud-Based Computing Environments

Figure 1:
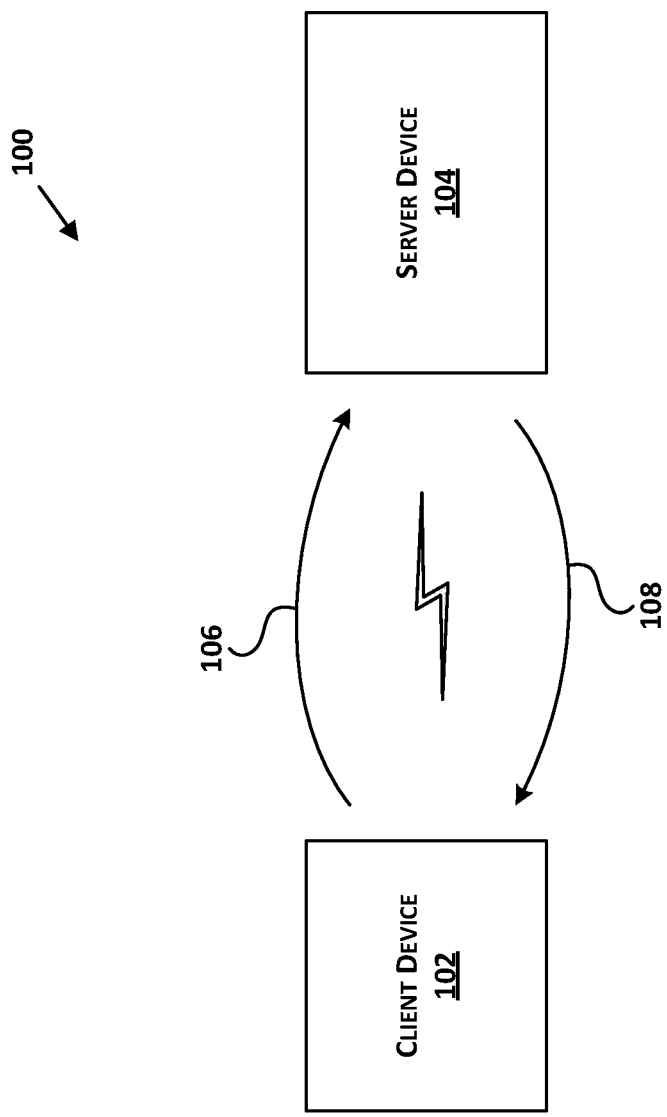
FIG. 1 is a high-level depiction of a client-server computing system, according to an example embodiment.

FIG. 1 illustrates an example communication system 100 for carrying out one or more of the embodiments described herein. Communication system 100 may include computing devices. Herein, a "computing device" may refer to either a client device, a server device (e.g., a stand-alone server computer or networked cluster of server equipment), or some other type of computational platform.

Client device 102 may be any type of device including a personal computer, laptop computer, a wearable computing device, a wireless computing device, a head-mountable computing device, a mobile telephone, tablet computing device, or sensor device, etc., that is configured to transmit data 106 to and/or receive data 108 from a server device 104 in accordance with the embodiments described herein. For example, in FIG. 1, client device 102 may communicate with server device 104 via one or more wireline or wireless interfaces. In some cases, client device 102 and server device 104 may communicate with one another via a local-area network. Alternatively, client device 102 and server device 104 may each reside within a different network, and may communicate via a wide-area network, such as the Internet.

Client device 102 may include a communication interface, a main processor, data storage (e.g., memory), and an optional user interface. The data storage may contain instructions executable by the main processor for carrying out one or more operations relating to the data sent to, or received from, server device 104. The data storage may also contain data operated on by the instructions. The user interface of client device 102, to the extent that it exists, may include buttons, a touchscreen, a microphone, and/or any other elements for receiving inputs, as well as a speaker, one or more displays, and/or any other elements for communicating outputs.

Server device 104 may be any entity or computing device arranged to carry out the server operations described herein. Further, server device 104 may be configured to send data 108 to and/or receive data 106 from the client device 102.

Data 106 and data 108 may take various forms. For example, data 106 and 108 may represent packets transmitted by client device 102 or server device 104, respectively, as part of one or more communication sessions. Such a communication session may include packets transmitted on a signaling plane (e.g., session setup, management, and teardown messages), and/or packets transmitted on a media plane (e.g., text, graphics, audio, and/or video data).

Regardless of the exact architecture, the operations of client device 102, server device 104, as well as any other operation associated with the architecture of FIG. 1, can be carried out by one or more computing devices. These computing devices may be organized in a standalone fashion, in cloud-based (networked) computing environments, or in other arrangements.

Figure 2:
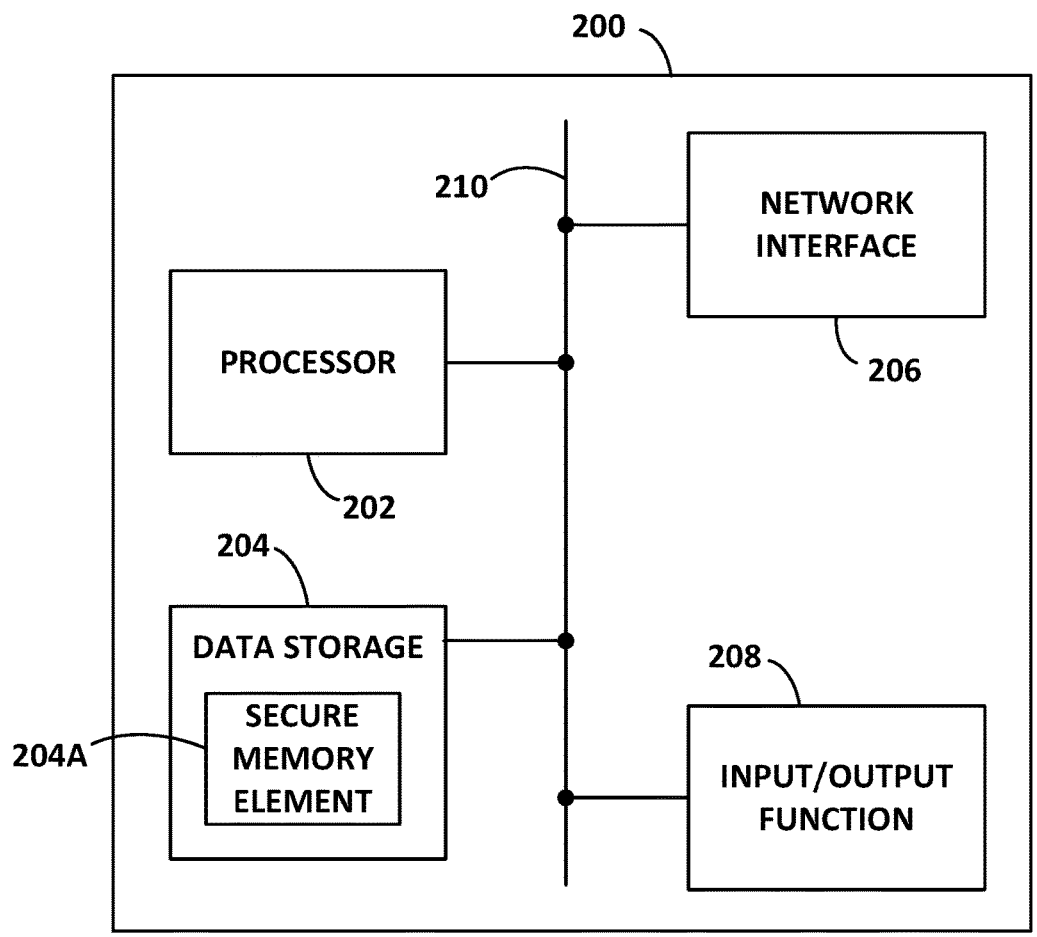
FIG. 2 illustrates a schematic drawing of a computing device, according to an example embodiment.

FIG. 2 is a simplified block diagram exemplifying a computing device 200, illustrating some of the functional components that could be included in a computing device arranged to operate in accordance with the embodiments herein. Example computing device 200 could be a client device, a server device, or some other type of computational platform. For purposes of simplicity, this specification may equate computing device 200 to a client device from time to time. Nonetheless, the description of computing device 200 could apply to any component used for the purposes described herein.

In this example, computing device 200 includes a processor 202, a data storage 204, a network interface 206, and an input/output function 208, all of which may be coupled by a system bus 210 or a similar mechanism. Processor 202 can include one or more CPUs, such as one or more general purpose processors and/or one or more dedicated processors (e.g., application specific integrated circuits (ASICs), digital signal processors (DSPs), network processors, etc.).

Data storage 204, in turn, may comprise volatile and/or non-volatile data storage and can be integrated in whole or in part with processor 202. Data storage 204 can hold program instructions, executable by processor 202, and data that may be manipulated by these instructions to carry out the various methods, processes, or operations described herein. Alternatively, these methods, processes, or operations can be defined by hardware, firmware, and/or any combination of hardware, firmware and software. By way of example, the data in data storage 204 may contain program instructions, perhaps stored on a non-transitory, computer-readable medium, executable by processor 202 to carry out any of the methods, processes, or operations disclosed in this specification or the accompanying drawings.

Data storage 204 may include secure memory element 204A. Secure memory element 204A may be any type of smart card, hardware security module, secure integrated circuit, protected memory unit, or protected memory area of a memory or microcontroller chip. Secure memory element 204A may support secure storage of data by way of encryption and/or conductive shielding, and may support the locking of certain memory areas after these memory areas are written. Conductive shielding may prevent or inhibit efforts to read signaling or communication internal to secure memory element 204A. Locked memory areas may be configured so that the data therein cannot change without use of an appropriate cryptographic key. Thus, secure memory element 204A may include a microprocessor or microcontroller that, for example, decrypts data stored in secure memory element 204A when presented with such a key.

Advantageously, processes or applications operating on computing device 200 may be prevented from accessing data stored in secure memory element 204A unless this key is presented to secure memory element 204A. Secure memory element 204A may also be tamper resistant or tamper proof, such that attempts to improperly access data in secure memory element 204A may result in automatic erasure or destruction of that data, or at least an audit trail of the attempts.

Nonetheless, in some embodiments, a secure memory element may not be used. Instead, a "regular," non-secure memory store data in computing device 200.

Network interface 206 may take the form of a wireline connection, such as an Ethernet, Token Ring, or T-carrier connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may comprise multiple physical interfaces.

Input/output function 208 may facilitate user interaction with example computing device 200. Input/output function 208 may comprise multiple types of input devices, such as a keyboard, a mouse, a touch screen, one or more buttons, and so on. Similarly, input/output function 208 may comprise multiple types of output devices, such as a screen, monitor, printer, or one or more light emitting diodes (LEDs). In some client devices, such as those with a small form factor, input/output function 208 may be minimal. Additionally or alternatively, example computing device 200 may support remote access from another device, via network interface 206 or via another interface (not shown), such as a universal serial bus (USB) or high-definition multimedia interface (HDMI) port. In some client devices, such as those with a small form factor, input/output function 208 may be minimal or non-existent.

In some embodiments, one or more computing devices may be deployed in a networked architecture. The exact physical location, connectivity, and configuration of the computing devices may be unknown and/or unimportant to client devices. Accordingly, the computing devices may be referred to as "cloud-based" devices that may be housed at various remote locations.

Figure 3:
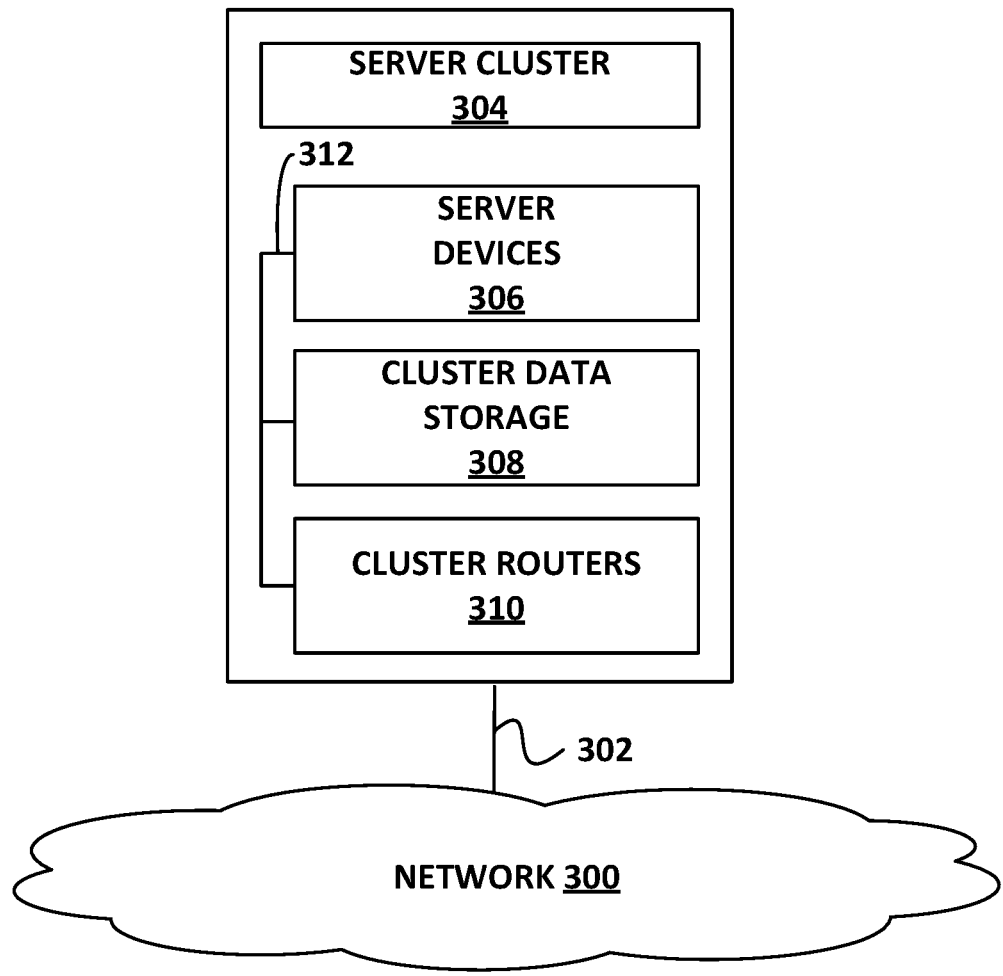
FIG. 3 illustrates a schematic drawing of a networked server cluster, according to an example embodiment.

FIG. 3 depicts a cloud-based server cluster 304 in accordance with an example embodiment. In FIG. 3, functions of a server device, such as server device 104 (as exemplified by computing device 200) may be distributed between server devices 306, cluster data storage 308, and cluster routers 310, all of which may be connected by local cluster network 312. The number of server devices, cluster data storages, and cluster routers in server cluster 304 may depend on the computing task(s) and/or applications assigned to server cluster 304.

For example, server devices 306 can be configured to perform various computing tasks of computing device 200. Thus, computing tasks can be distributed among one or more of server devices 306. To the extent that these computing tasks can be performed in parallel, such a distribution of tasks may reduce the total time to complete these tasks and return a result. For purposes of simplicity, both server cluster 304 and individual server devices 306 may be referred to as "a server device." This nomenclature should be understood to imply that one or more distinct server devices, data storage devices, and cluster routers may be involved in server device operations.

Cluster data storage 308 may be data storage arrays that include disk array controllers configured to manage read and write access to groups of hard disk drives. The disk array controllers, alone or in conjunction with server devices 306, may also be configured to manage backup or redundant copies of the data stored in cluster data storage 308 to protect against disk drive failures or other types of failures that prevent one or more of server devices 306 from accessing units of cluster data storage 308.

Cluster routers 310 may include networking equipment configured to provide internal and external communications for the server clusters. For example, cluster routers 310 may include one or more packet-switching and/or routing devices configured to provide (i) network communications between server devices 306 and cluster data storage 308 via cluster network 312, and/or (ii) network communications between the server cluster 304 and other devices via communication link 302 to network 300.

Additionally, the configuration of cluster routers 310 can be based at least in part on the data communication requirements of server devices 306 and cluster data storage 308, the latency and throughput of the local cluster networks 312, the latency, throughput, and cost of communication link 302, and/or other factors that may contribute to the cost, speed, fault-tolerance, resiliency, efficiency and/or other design goals of the system architecture.

As a possible example, cluster data storage 308 may include any form of database, such as a structured query language (SQL) database. Various types of data structures may store the information in such a database, including but not limited to tables, arrays, lists, trees, and tuples. Furthermore, any databases in cluster data storage 308 may be monolithic or distributed across multiple physical devices.

Server devices 306 may be configured to transmit data to and receive data from cluster data storage 308. This transmission and retrieval may take the form of SQL queries, and the output of such queries, respectively. Additional text, images, video, and/or audio may be included as well. Furthermore, server devices 306 may organize the received data into web page representations. Such a representation may take the form of a markup language, such as the hypertext markup language (HTML), the extensible markup language (XML), or some other standardized or proprietary format. Moreover, server devices 306 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

2. Examples of Secure Provisioning and Secure Access to Data and Services

Figure 4:
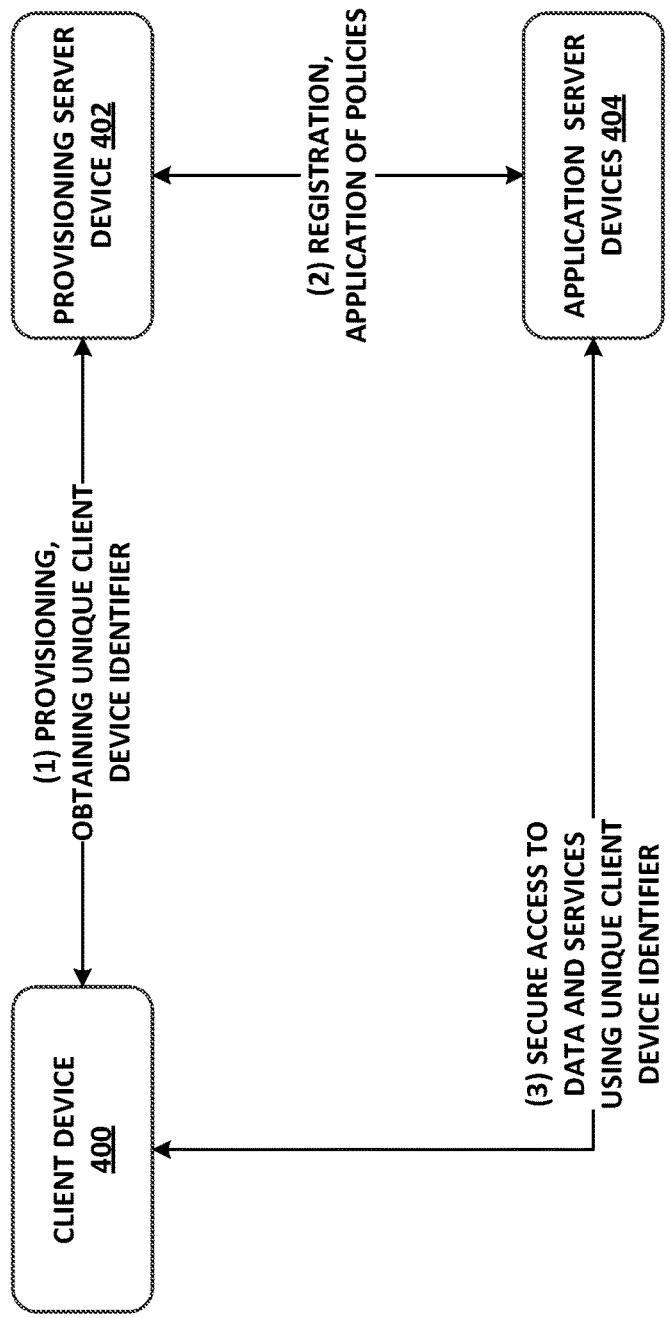
FIG. 4 depicts a high-level representation of secure device-level authentication, according to an example embodiment.

FIG. 4 depicts a high-level representation of secure device-level authentication, according to an example embodiment. In particularly, FIG. 4 depicts a three-step process in which a client device 400 obtains a unique client device identifier, is registered by provisioning server device 402 with one or more application server devices 404, and then securely accesses protected information (e.g., data and services) from application server devices 404.

As noted above, client device 400 may be any of a printer, media device (e.g., stereo, television, DVD player), mobile computing device (e.g., cell phone, tablet), health-monitoring equipment (e.g., fitness tracker), household automation and monitoring device (e.g., "smart" thermostat or lock), network-enabled kiosk (e.g., parking meter, vending machine), or industrial control and monitoring device (e.g., a type of sensor). Further, client device 400 may be any type of personal computer, laptop, or other device. In some cases, the operations described herein as being attributed to client device 400 may be carried by a web browser operating on client device 400. Still, other possibilities exist.

Provisioning server device 402 may be any type of server device that is configured to provision client devices. As such, provisioning server device 402 may be a standalone server, or its functions may be combined with those of application server devices 404 or other devices. Thus, provisioning server device 402 and application server devices 404 may be separate and distinct physical hardware, or may share the same physical hardware.

Client device 400 may contact provisioning server device 402 when client device 400 is activated and determines that it has not yet been provisioned. This initial contact may occur when client device 400 is turned on for the first time, e.g., after purchase of client device 400, or later in the operational lifetime of client device 400. Regardless, in step (1) illustrated in FIG. 4, client device 400 may carry out a provisioning transaction with provisioning server device 402, a result of which is for client device 400 to obtain a unique client device identifier.

For the embodiments herein, a unique client device identifier may be any string of bits that can be used to distinguish client device 400 from other client devices. Since there may be billions of client devices deployed, this string of bits may be long enough to uniquely identify such a large number of client devices. For instance, a 1024-bit, 2048-bit, or 4096-bit string length may be used. Further, in order to reduce the probability that a unique client device identifier can be guessed or discovered by brute force operations, the overall string space (e.g., the $2^{1024}$, $2^{2048}$, or $2^{4096}$ possible strings from which unique client device identifiers can be selected) may be sparsely populated by randomly-generated unique client device identifiers. Thus, someone attempting to guess unique client device identifiers that are actually in use is unlikely to be able to do without significant trial and error.

In some cases, a unique client device identifier may be an encoding of information that is human-perceivable when decoded. For instance, a unique client device identifier that represents text characters, binary code, a picture, audio, and/or video may be used.

Regardless, once a unique client device identifier is established for client device 400, in step (2) illustrated in FIG. 4, provisioning server 402 may register client device 400 with application server devices 404. For instance, provisioning server 402 may write a representation of the unique client device identifier to a database (not shown) along with other information regarding client device 400. In some cases, this representation of the unique client device identifier may be a hash thereof, so that the unique client device identifier is not attainable even if the database is compromised.

A hash of the unique client device identifier may be the result of applying a cryptographic one-way function to the unique client device identifier. Such a function allows one to easily verify that the unique client device identifier maps to an associated hash value, but obtaining the unique client device identifier based on the hash value is intractable. Examples of such hash functions include MD5, SHA-1, SHA-2, and SHA-3.

The other information regarding client device 400 may include any type of data, policy, or other records that application server devices 404 may store or access, or apply to client device 400. This may include, but is not limited to, configuration files, data files, program code, object code, or representations of permissions or capabilities of client device 400. In some embodiments, application server devices 404 may use such information to determine how to communicate with client device 400 and what can be included in such communications. In general, this other information may be referred to "protected information" as it might not be available to client devices other than client device 400.

At step (3) illustrated in FIG. 4, client device 400 may securely access data and services of application server devices 404. Client device 400 may use its unique client device identifier to do so, thus obviating the need for traditional and less secure userid/password pairs to protect such a transaction.

In some embodiments, client device 400 may be provided with more than one server certificate, each for accessing different sets of one or more server devices. For instance, a client device may communicate with several distinct server devices or server clusters. In that case, the client device may be provisioned with server certificates for each one of these entities. Also, a client device may change "ownership"—for example a client device may be sold to a new owner. The new owner may want the client device to operate with different services than the old owner. Thus, a new server certificate can be provided to the client device that specifies new server device(s). As a consequence, at least some of steps (2) and (3) may repeat for each server certificate.

Figure 5A:
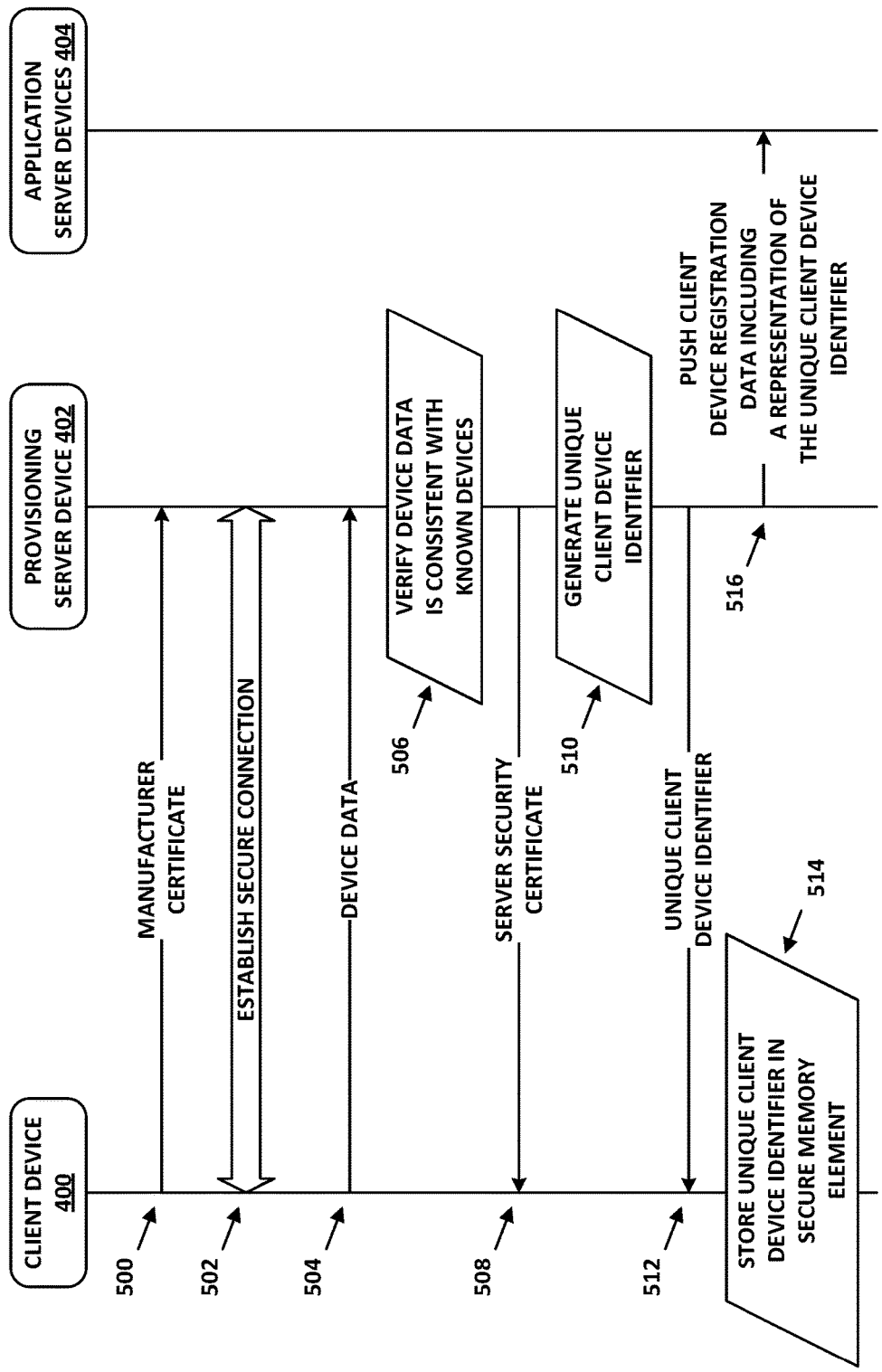
FIG. 5A depicts a message flow for secure provisioning of a client device, according to an example embodiment.
Figure 5B:
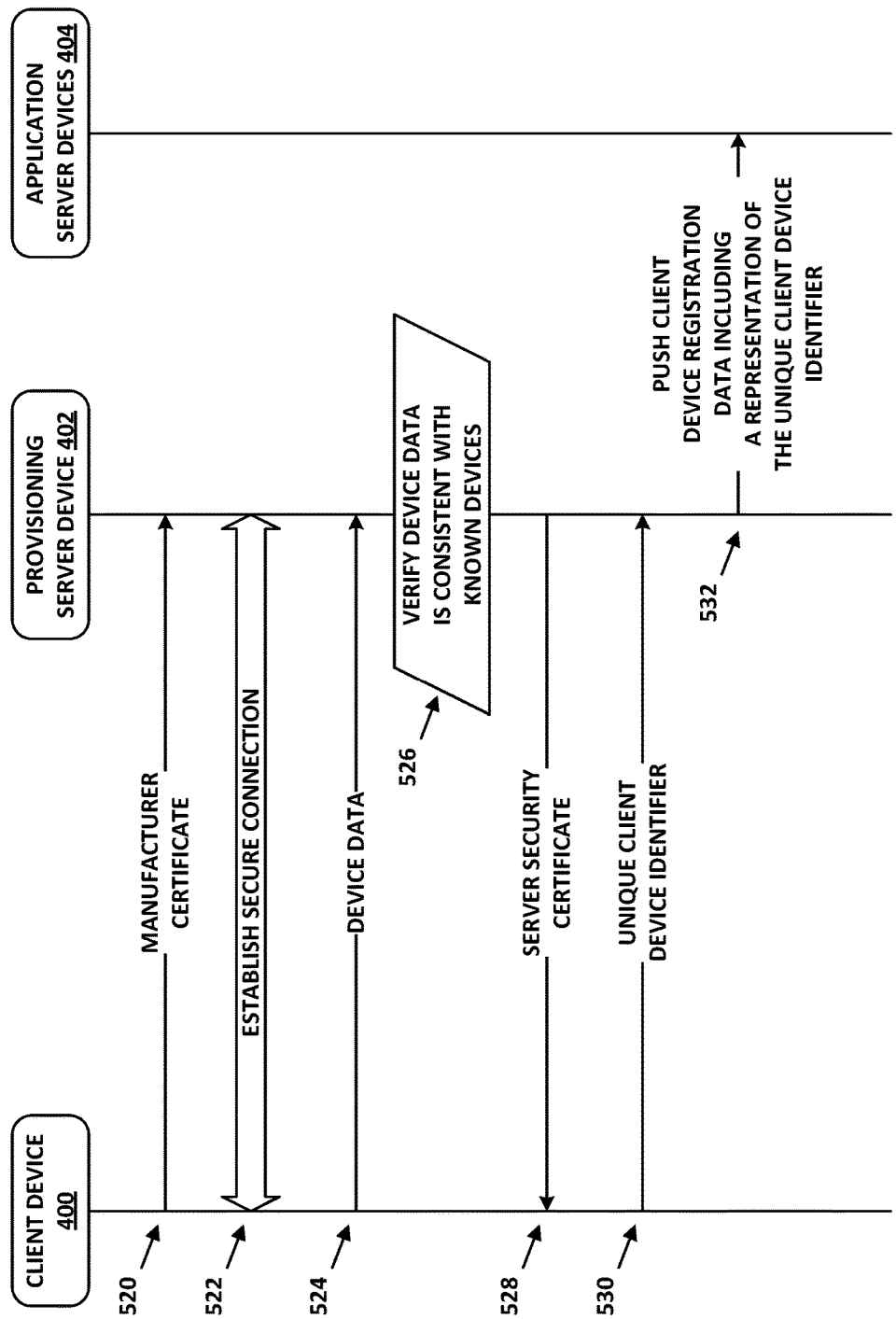
FIG. 5B depicts another message flow for secure provisioning of a client device, according to an example embodiment.
Figure 5C:
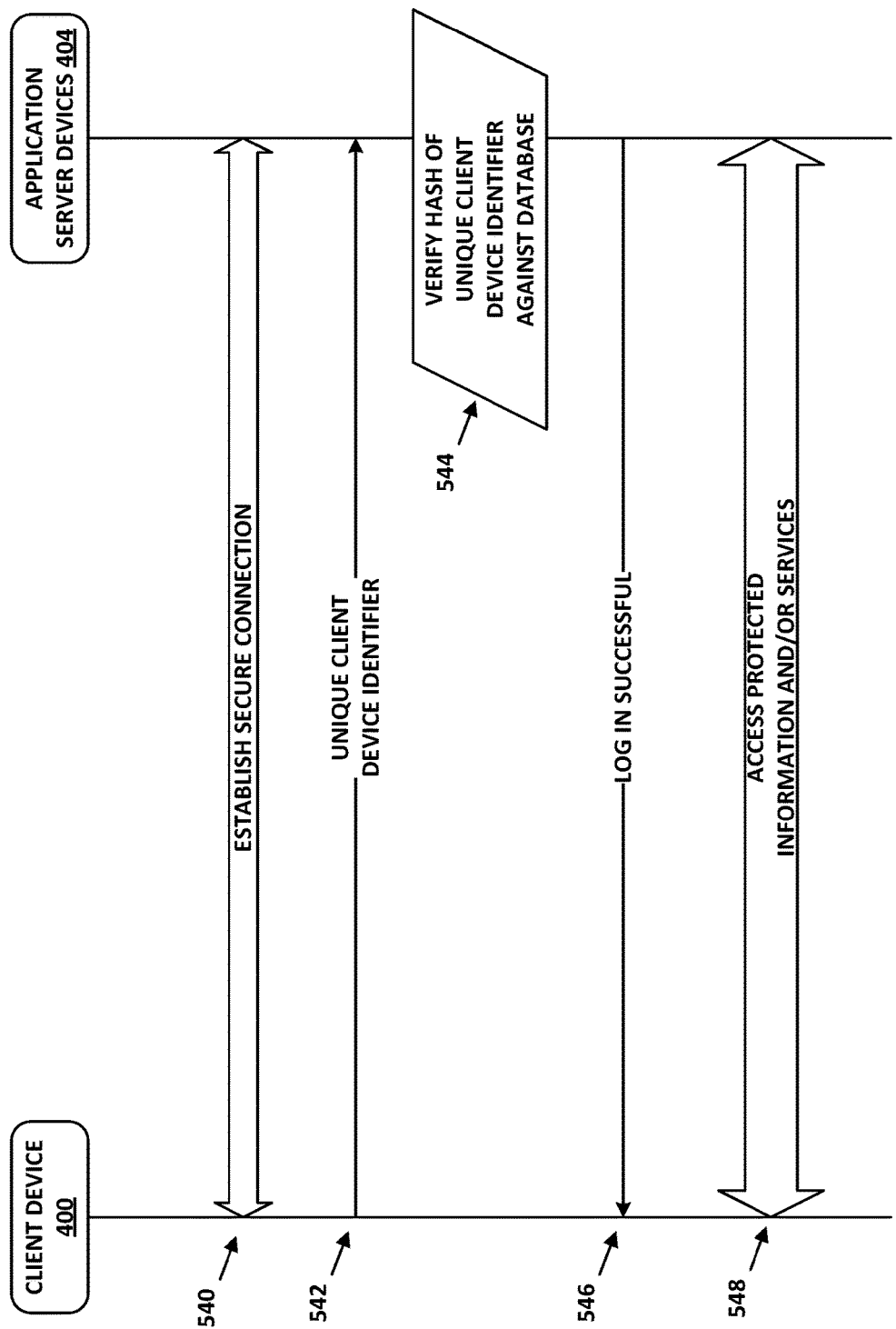
FIG. 5C depicts a message flow for a provisioned client device to access protected information, according to an example embodiment.

FIGS. 5A, 5B, and 5C illustrate these embodiments in more detail. Both FIGS. 5A and 5B exemplify embodiments of steps (1) and (2) of FIG. 4, while FIG. 5C exemplifies an embodiment of step (3) of FIG. 4.

Thus, FIG. 5A depicts a message flow for secure provisioning of a client device, according to an example embodiment. As an initial matter, client device 400 may be provisioned with a manufacturer certificate. This manufacturer certificate may take the form of a file, data structure, or other representation that includes a public encryption key that is associated with client device 400 or the manufacturer of client device 400. The manufacturer certificate may include other information, such as a serial number, version number, dates of validity, and/or identification of the manufacturer.

Some or all information in the manufacturer certificate may be digitally signed by the manufacturer's private signature key or the private signature key of a certificate authority. The manufacturer certificate may be stored in client device 400 during the manufacturing process.

In accordance with public-key cryptosystem technology, the public encryption key may be mathematically related to a private encryption key, and the private signature key may be mathematically related to a public signature key. In the embodiments herein, a public key may be used to encrypt data or to verify a digital signature formed by its associated private key. A private key may be used to decrypt data encrypted by its associated public key, or to create a digital signature that can be validated by this public key.

At step 500, client device 400 initially contacts provisioning server device 402 by transmitting the manufacturer certificate to provisioning server device 402. After receiving the manufacturer certificate, provisioning server device 402 may validate this manufacturer certificate (not shown). For instance, provisioning server device 402 may, by way of a public-key infrastructure, obtain a public signature key of the manufacturer, and apply this public signature key to the manufacturer certificate to verify that the manufacturer digitally signed the manufacturer certificate. After verifying that this is the case, provisioning server device 402 can trust that the public encryption key therein was provided by the manufacturer. Note that different public encryption keys may be provisioned into different client devices. In some cases, multiple public encryption keys may be associated with the same client device.

At step 502, a secure connection may be established between client device 400 and provisioning server device 402. In some embodiments, this secure connection may be established and operated in accordance with the Secure Sockets Layer (SSL) or Transport Layer Security (TLS) protocols, among other possibilities. An SSL transaction, for sake of example, assumes that provisioning server device 402 has its own public/private encryption key pair. Provisioning server device 402 may also obtain its own certificate containing (among other items) its public encryption key signed by a certificate authority.

To initiate the SSL transaction, client device 400 may transmit a request for the certificate of provisioning server device 402. Once client device 400 receives the certificate, client device 400 may use the public key infrastructure to verify the certificate. At this point, both client device 400 and provisioning server device 402 have obtained each other's public encryption keys. With these keys, client device 400 and provisioning server device 402 can use a public key exchange technique, such as Rivest-Shamir-Adelman (RSA) or Diffie-Hellman, to agree upon a symmetric encryption key and encryption cipher for secure communication therebetween.

In some embodiments, step 500 may be part of step 502. For instance, client device 400 may request and receive the certificate of provisioning server device 402, then provisioning server device 402 may request and receive the certificate of client device 400 (the manufacturer certificate).

Advantageously, steps 500 and 502 may result in client device 400 and provisioning server device 402 each authenticating themselves to one another, rather than just the one-way authentication typically used with SSL and TLS. In this way, additional security is in place for further communication between these devices. It should be noted that these SSL or TLS transactions may occur with or without the involvement of a web browser on the client device.

In some cases, a manufacturer may provide a certificate of another entity as the "manufacturer certificate." For instance, the manufacturer of a client device might offer one sub-model of a particular model of the client device to one service provider, and another sub-model to another service provider. For each client device, the certificate of the service provider associated with the client device's sub-model may be configured in the client device during manufacture.

In any case, at step 502, a secure connection is established between client device 400 and provisioning server device 402. Steps 504, 508, and 512 may involve transmissions between these devices over the secure connection.

At step 504, client device 400 may transmit device data to provisioning server device 402. This device data may include any of a manufacturer identity, a type, a model number, a serial number, and so on. At step 506, provisioning server device 402 may look up this device data in a device database to verify that it is consistent with known devices. If the device data is unknown or unsupported, provisioning server device 402 may end this transaction without provisioning client device 400.

At step 508, assuming that the client device is known, provisioning server device 402 may transmit a server security certificate to client device 400. The server security certificate may be associated with one or more of application server devices 404. For instance, the server security certificate may contain a public encryption key of one or more of application server devices 404. In some cases, multiple server security certificates, each associated with one or more of application server devices 404, may be provided to client device 400.

At step 510, provisioning server device 402 may generate a unique client device identifier. At step 512, provisioning server device 402 may transmit this unique client device identifier to client device 400.

At step 514, client device 400 may store the unique client device identifier in its secure memory element. In some cases, this storing procedure may include writing the unique client device identifier to the secure memory element and locking or otherwise protecting the memory in which the unique client device identifier is stored. As noted above, in some embodiments, a non-secure memory element may be used instead.

At step 516, provisioning server device 402 may transmit or push client registration data, including a representation of the unique client device identifier, to application server devices 404. For instance, provisioning server device 402 may generate a hash of the unique client device identifier, compare the hash to other hashes associated with other unique client device identifiers, and verify that the generated hash is unique amongst the other hashes. In doing so, provisioning server device 402 reduces the likelihood that any two client devices are assigned the same client device identifier.

After steps 514 and 516 complete, client device 400 is prepared to securely communicate with one or more of application server devices 404. Such communication is discussed below in the context of FIG. 5C.

FIG. 5B depicts another message flow for secure provisioning of a client device, according to an example embodiment. In FIG. 5B, steps 520, 522, 524, 526, and 528 are identical to those of steps 500, 502, 504, 506, and 508 of FIG. 5A. However, in the embodiment of FIG. 5B, client device 400 is either pre-provisioned with a unique client device identifier (e.g., during manufacture), or generates the unique client device identifier before or during the steps of FIG. 5B.

Thus, at step 530, client device 400 transmits the unique client device identifier over a secure connection to provisioning server device 402. Provisioning server device 402 may generate a hash of the unique client device identifier, compare the hash to other hashes associated with other unique client device identifiers, and verify that the generated hash is unique amongst the other hashes. If there is a collision between the hash of the unique client device identifier and another hash, provisioning server device 402 may inform client device 400 of this fact, and the procedure of FIG. 5B may terminate. Alternatively, client device 400 may generate a new unique client device identifier and transmit this unique client device identifier to provisioning server device 402 for registration.

Assuming there is no collision, at step 532, provisioning server device 402 may transmit or push client registration data, including a representation of the unique client device identifier, to application server devices 404. Thus, step 532 is analogous to step 516 of FIG. 5A.

It should be noted that the transactions of FIGS. 5A and 5B are only two possible embodiments. Other embodiments that provide similar outcomes may exist.

FIG. 5C depicts a message flow for a provisioned client device to access protected information, according to an example embodiment. For instance, client device 400 may contact one of application server devices 404 to access protected information.

Accordingly, at step 540, client device 400 may establish a secure connection with one of application server devices 404. This secure connection may also be based on SSL or TLS, and may involve two-way authentication of client device 400 and the one of the application server devices 404 using the manufacturer certificate and the server certificate, respectively. Regardless, the messages of steps 542, 546, and 548 may be transmitted over this secure connection.

At step 542, client device 400 may transmit the unique client device identifier (or a representation thereof, such as a hash) to the one of application server devices 404. At step 544, the one of application server devices 404 may verify a hash of the unique client device identifier in a database of such hashes, each hash in the database being associated with a registered client device. Once the hash is verified, the one of application server devices 404 may transmit an indication that the log in was successful to client device 400.

At step 548, client device 400 may engage in one or more transactions with the one of application server devices 404 to access protected information and/or services. As noted above, this protected information may include any form of data or program logic. Also, the one of application server devices 404 may perform services on behalf of client device 400 as part of providing the protected information.

Advantageously, the embodiments of FIGS. 5A, 5B, and 5C improve upon existing methods of accessing data at a server device. Currently, most remote data access is secured by userid/password pairs. Copies of these userids and passwords may be stored at both client devices and server devices. Thus, if either the client device or server device is compromised by a third party, the third party may be able to obtain these credentials.

Further, users may have dozens of such accounts, which either requires that users memorize a commensurate number of alphanumeric combinations making up their userids and passwords, or reuse common userids and passwords across multiple accounts. The former may not be practical, and may result in the users writing down their userid/password pairs or storing them electronically. In either case, such unsecured credentials may be discovered and used by third parties. The latter only serves to lessen security, because if one of the user's accounts is compromised, then others may be at risk. Additionally, web browsers may store userids and passwords, providing another avenue through which these credentials can be compromised. Also, users tend to select low-entropy passwords that are relatively easy to guess.

Various two-phase authentication systems exist to enhance userid/password security. Some of these systems use phone verification, providing a random code to a user via phone call or text message when the user attempts to log in to his or her account. However, such mechanisms are inconvenient and cumbersome, especially when the user does not have his or her phone or is out of coverage.

In the embodiments herein, the unique client device identifier is never transmitted without encryption, and may be stored in a secure memory element. Further, the unique client device identifier does not need to be stored in server devices for a long period of time, as a hash thereof can be stored instead. Where the unique client device identifier is received by a server device, the server device may store it just long enough to verify the client device (e.g., a few seconds or less). This greatly lessens the opportunities for a third party to access the unique client device identifier.

Further, since the unique client device identifier may be a long random bit string, it is hard to guess or discover by brute force. But even if a unique client device identifier is discovered, it cannot be used without also having a signed manufacturer certificate and an associated private encryption key of a client device.

Also, most device-level security solutions today provide only one-way authentication of devices to one another. For instance, by way of a certificate, one device identifies itself to the other device. Such procedures are subject to man-in-the-middle attacks. As an example, an attacker may intercept communication between the devices and replace a device certificate therein with one of its own. The other device may conclude the transaction with the attacker, resulting in the attacker having trusted status with the other device. By using two-way device-level authentication, these attacks can be thwarted. The present embodiments may involve the device securely logging in to the service of the legitimate service provider. The second authentication eliminates the man-in-the-middle attack scenario.

The embodiments herein provide a simple, fast, and low-cost method for granting client devices secure access to server devices. These advantages are particularly important as the number of client devices worldwide is expected to grow tremendously in the coming years. Many of these devices may be small-profile standalone client devices, such as remote sensors, wearable devices, and so on. The overhead of provisioning each of these devices manually can be removed by using the device-level authentication techniques described herein. To that point, client devices can be provisioned automatically without user intervention.

Moreover, these techniques may be advantageous for legacy client devices as well. For instance, in the same or a similar manner to the embodiments of FIGS. 5A, 5B, and 5C, a unique client device identifier can be provisioned to a personal computer, laptop, computer, tablet, or cell phone. This unique client device identifier may be used, for instance, by a web browser on this client device to securely access one or more web servers without requiring the user to enter a userid or password. Thus, when a user browses to a particular web site, the web browser may automatically log in to the site using the unique client device identifier.

3. Example Use Cases

This section provides some example use cases of the device-level authentication techniques described herein. These use cases are not exhaustive, and other use cases may exist.

A. Home Automation and Security

A number of vendors provide home automation and security services. Various devices within a user's home, such as lights, door locks, monitoring cameras, small appliances, and thermostats may be managed remotely by the user. The user may add more devices to the system incrementally by purchasing wireless controllers for these devices, or devices with integrated control. A server within the home or situated remotely may monitor and control these devices.

When the user purchases and activates such a new client device, the client device may use the techniques herein to register with the server. This registration process can be seamless, with the user merely turning the device on. The device may automatically configure itself with assistance from the server, and may be securely connected to the server for further communication. The manufacturer certificate included with the client device may be that of the manufacturer of the client device, that of the home automation and security service, or a combination of both.

B. Power Distribution

Power companies may provide electrical power to residential consumers and businesses. These companies build out complex distribution grids involves hundreds or thousands of substations, generators, transformers, grounding units, and service drops, among other devices. Each of these devices may be a client device that can be remotely controlled and/or monitored by a central office.

A power company may purchase these client devices from multiple vendors. When client devices are installed, the embodiments herein allow the power company to verify that client devices from the proper manufacturers have been installed in the proper places, and that no rogue client devices have been installed. These client devices may be provided with the power company's certificate, allowing the devices to "join" the power grid.

C. Wearable Computing Devices

With the rise of low-power wireless devices, wearable computers have become a reality. As one example, fitness trackers are small devices that can comfortably fit in a user's pocket, and may track the number of steps that the user takes each day. The user may be able to access his or her current and historical fitness data via a web site operated by the fitness tracker's manufacturer or another party.

Regardless, when the user activates the fitness tracker, it may automatically configure itself or do so with the assistance of the user. For instance, the fitness tracker may be accompanied by an application that can be loaded on the user's cell phone, tablet, or computer that configures the fitness tracker for using Wifi networks at the user's residence, or Bluetooth (or another pesonal area network technology) between the fitness tracker and the user's cell phone, tablet or personal computer. Once so configured, the fitness tracker may be able to wirelessly communicate with a provisioning server, which provisions the fitness tracker for access to the web site. The fitness tracker may then download configuration information from the web site, and upload fitness tracking data. The user may be provided, by the fitness tracker or the application, a code to enter at the web site so that the user can establish his or her account therewith. Once the account is accessible to the user, the user may customized the fitness tracker's configuration and review his or her fitness data. Notably, all of this can be accomplished without a userid or password being used by the fitness tracker.

4. Example Operations

Figure 6:
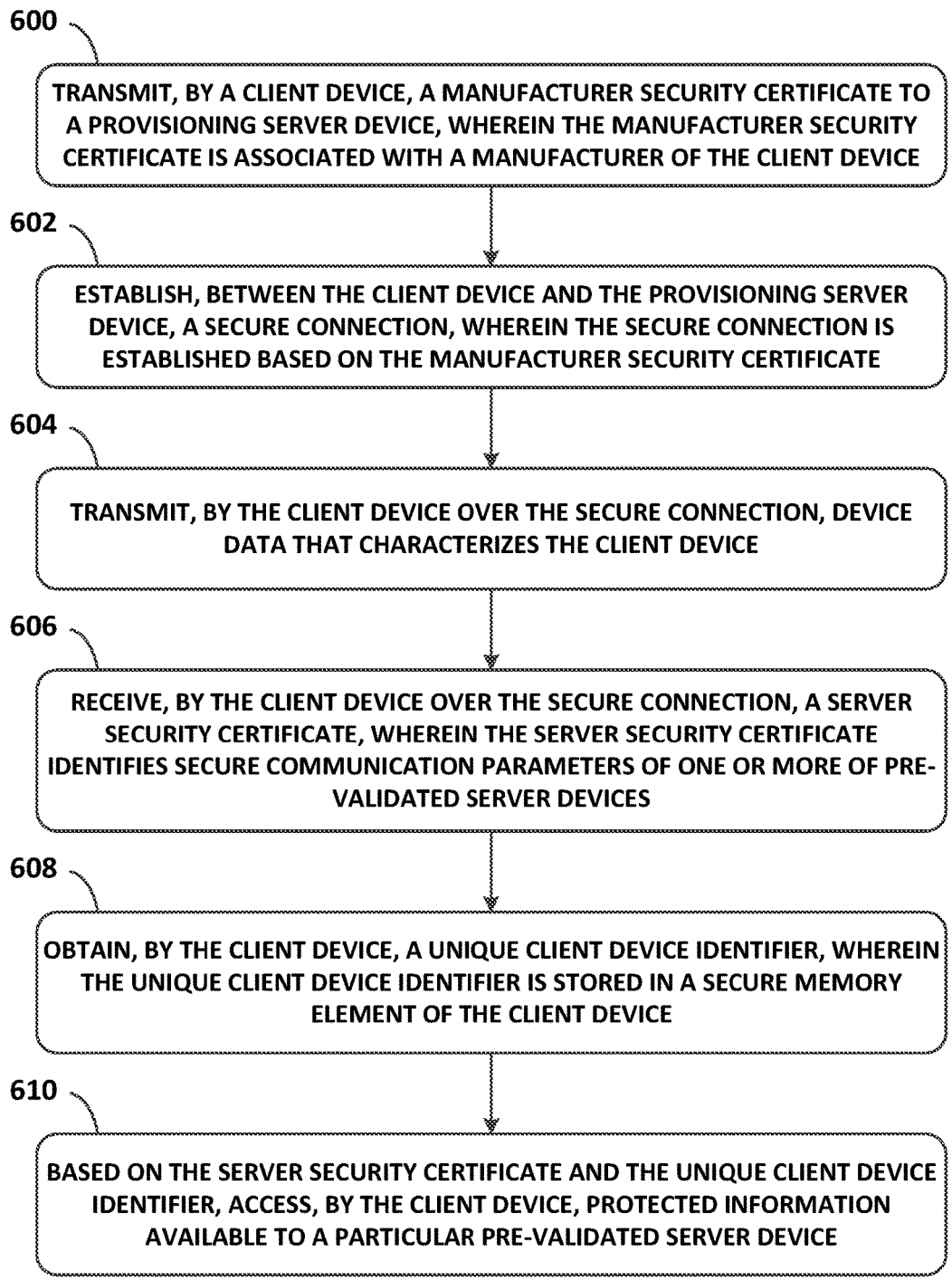
FIG. 6 depicts a flow chart, according to an example embodiment.
Figure 7:
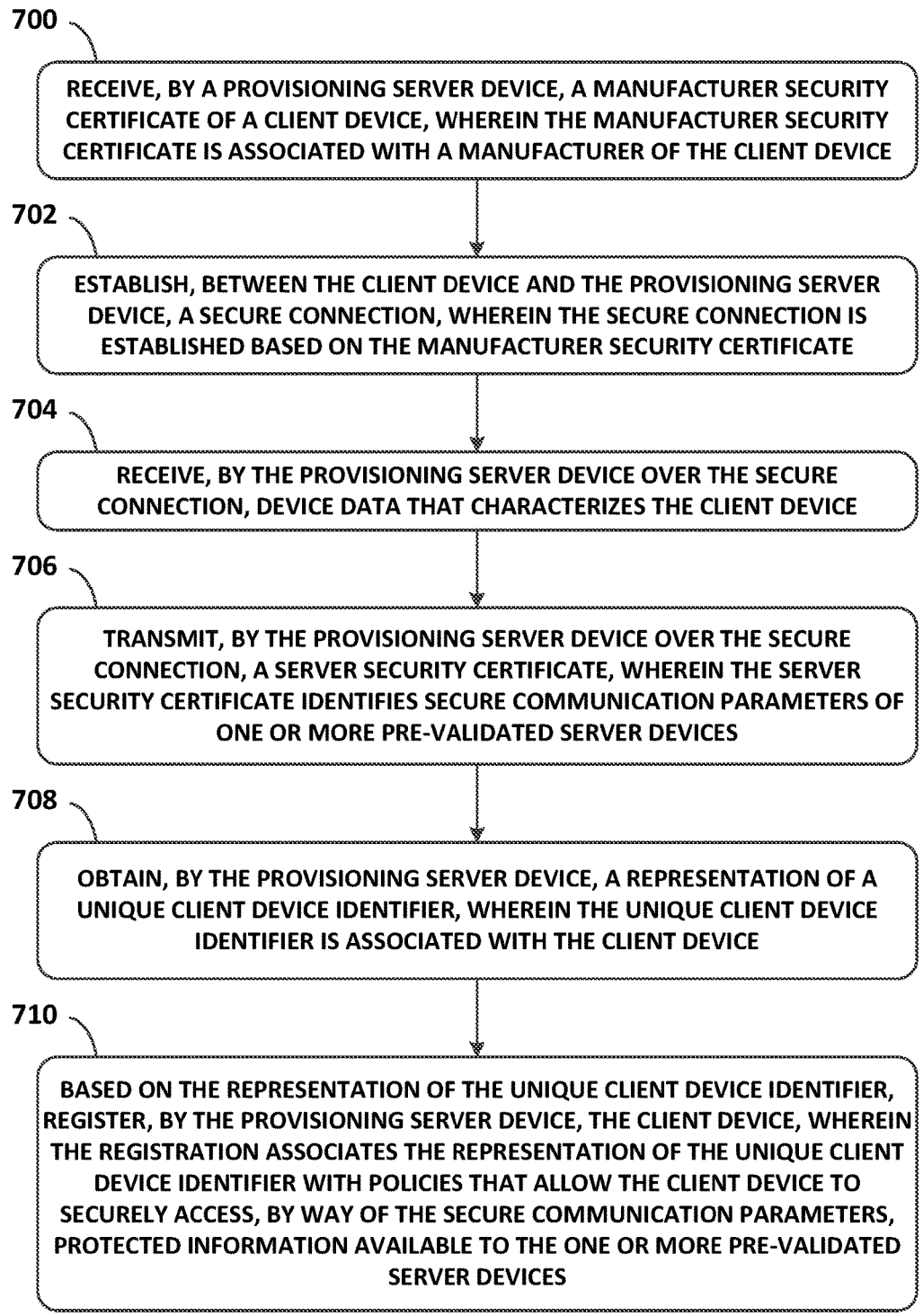
FIG. 7 depicts another flow chart, according to an example embodiment.

FIGS. 6 and 7 are flow charts illustrating example embodiments. The process illustrated by FIG. 6 may be carried out by a client device, such as computing device 200. The process illustrated by FIG. 7 may be carried out by a server device or system, such as server cluster 304. However, the processes can be carried out by other types of devices or device subsystems. Additionally, these embodiments may be combined with one another, in part or in whole.

Block 600 may involve transmitting, by a client device, a manufacturer security certificate to a provisioning server device. The manufacturer security certificate may be associated with a manufacturer of the client device.

Block 602 may involve establishing, between the client device and the provisioning server device, a secure connection. The secure connection may be established based on the manufacturer security certificate and possibly a certificate of the provisioning server device as well. In some embodiments, the secure connection may be based on SSL or TLS protocols, among other possibilities.

Block 604 may involve transmitting, by the client device over the secure connection, device data that characterizes the client device.

Block 606 may involve receiving, by the client device over the secure connection, a server security certificate. The server security certificate may identify secure communication parameters of one or more of pre-validated server devices. The provisioning server device may be one of the pre-validated server devices. Alternatively, the provisioning server device and the pre-validated server devices may be distinct physical or virtual machines.

Block 608 may involve obtaining, by the client device, a unique client device identifier. The unique client device identifier may be stored in a secure memory element of the client device.

Block 610 may involve, possibly based on the server security certificate and the unique client device identifier, accessing, by the client device, protected information available to a particular pre-validated server device. Accessing the protected information may occur without the client device transmitting user-level security credentials to the particular pre-validated server device. For instance, a user-specific userid and/or password, certificate, or cryptographic key may be omitted from transactions between the client device and the particular pre-validated server device. Doing so renders the transaction more secure, as an observer would not be able to determine these credentials from reading network traffic from these transactions.

In some embodiments, accessing the protected information may involve establishing, between the client device and the particular pre-validated server device, a second secure connection. The second secure connection may be established based on the server security certificate. Accessing the protected information may also involve transmitting, by the client device over the second secure connection, a representation of the unique client device identifier, and receiving, by the client device over the second secure connection, the protected information. The representation of the unique client device identifier may be the unique client device identifier itself, a hash thereof, or some other representation. In some cases, at least one of the secure connection or the second secure connection is established, at least in part, by a web browser application operating on the client device.

In some embodiments, accessing the protected information available to the pre-validated server device may involve (i) receiving, from the pre-validated server device, an indication that the client device is permitted to establish a second secure connection with the pre-validated server device, and (ii) possibly in response to receiving the indication, establishing the second secure connection with the pre-validated server device. Alternatively or additionally, the client device may store a pool of unique tokens each usable once per an epoch defined by a pre-established number of seconds. Accessing the protected information available to the pre-validated server device may involve transmitting a message to establish a second secure connection with the pre-validated server device. The message may contain a particular token from the pool of unique tokens that has not been used in a current epoch.

In some cases, prior to transmitting the manufacturer security certificate to the provisioning server device, the client device might not have communicated with the provisioning server device or any of the one or more pre-validated server devices. For instance, the client device may be activated for the first time after manufacture when it engages in the transaction of FIG. 6.

In some embodiments, the client device may validate the server security certificate in response to receiving this certificate. Likewise, the provisioning server device may validate the manufacturer certificate in response to receiving that certificate from the client device.

In some implementations, obtaining the unique client device identifier may involve: (i) receiving, by the client device over the secure connection, the unique client device identifier, and (ii) writing, by the client device, the unique client device identifier to the secure memory element. Writing the unique client device identifier to the secure memory element may involve locking the secure memory element with the unique client device identifier stored therein.

In alternate embodiments, the unique client device identifier may be stored in the secure memory element during fabrication of the secure memory element. In other alternatives, obtaining the unique client device identifier may involve: (i) randomly generating, by the client device, the unique client device identifier, and (ii) writing, by the client device, the unique client device identifier to the secure memory element.

Turning to FIG. 7, block 700 may involve receiving, by a provisioning server device, a manufacturer security certificate of a client device. The manufacturer security certificate may be associated with a manufacturer of the client device;

Block 702 may involve establishing, between the client device and the provisioning server device, a secure connection. The secure connection may be established based on the manufacturer security certificate.

Block 704 may involve receiving, by the provisioning server device over the secure connection, device data that characterizes the client device.

Block 706 may involve transmitting, by the provisioning server device over the secure connection, a server security certificate. The server security certificate may identify secure communication parameters of one or more pre-validated server devices.

Block 708 may involve obtaining, by the provisioning server device, a representation of a unique client device identifier. The unique client device identifier may be associated with the client device.

Block 710 may involve, based on the representation of the unique client device identifier, registering, by the provisioning server device, the client device. The registration may associate the representation of the unique client device identifier with policies that allow the client device to securely access, by way of the secure communication parameters, protected information available to the one or more pre-validated server devices. Accessing the protected information may occur without the client device transmitting user-level security credentials to the one or more pre-validated server devices.

In some cases, the provisioning server device may also generate a hash of the unique client device identifier, compare the hash to other hashes associated with other unique client device identifiers, and verify that the hash is unique amongst the other hashes.

In some embodiments, obtaining the representation of the unique client device identifier may involve randomly generating the unique client device identifier, and transmitting, over the secure connection, the unique client device identifier. In other embodiments, obtaining the representation of the unique client device identifier may involve receiving the representation of the unique client device identifier from the client device over the secure connection.

A test transaction may be performed. This may involve, for instance, instructing, by the provisioning server device over the secure connection, the client device to perform a secure test transaction a particular pre-validated server device. Security of the secure test transaction may be based on the secure communication parameters.

A test transaction is defined as transaction which is in almost every aspect similar to a normal transaction (e.g., information is requested regarding a purchase of a product or service), but is triggered with a code characterizing it as a test transaction. Such a transaction does not spend actual money or credit, but may verify the legitimate identity of the requestor. A test transaction may also trigger a response from the particular pre-validated server device that confirms that all steps performed in the transaction have been executed correctly (except for the actual payment), and that delivers to a user of the client device a response mimicking an actual response (e.g., the client device may display a message such as "successful test transaction").

Test transactions may verify that device provisioning and device settings are properly configured. It can also enable verification that the particular pre-validated server device works correctly without having to send a person on site. Testing can also be performed routinely as part of a regular verification process (e.g., daily, weekly, etc.). A failure of a test transaction allows the owner of the particular pre-validated server device to take immediate action to fix the issue without causing customer dissatisfaction.

As noted above, a test transaction may be initiated by the particular pre-validated server device. In some cases, at the end of a provisioning or configuration process, the test transaction may be mandated by the system so that the particular pre-validated server device goes live only after one or several successful test transaction(s).

In some embodiments, either the provisioning server device or the pre-validated server devices may be configured to ignore or reject communication attempts from client devices for which the respective server device has not granted permission to communicate. Alternatively or additionally, the client device may store a pool of unique tokens each usable once per an epoch defined by a pre-established number of seconds. A server device may ignore or reject communication attempts from the client device unless the communication attempts contain a particular token from the pool of unique tokens that has not been used in a current epoch.

The embodiments of FIGS. 6 and 7 may be simplified by the removal of any one or more of the features shown therein. Further, these embodiments may be combined with features, aspects, and/or implementations of any of the previous figures or otherwise described herein.

These embodiments, as well as equivalent and alternative embodiments, are necessarily rooted in computer technology. The embodiments involve secure registration and provisioning of a client device with device-level authentication, as well as secure communication between the client device and one or more server devices. Thus, technical problems unique to computer networks such as the Internet are addressed, and technical solutions are provided. Indeed, the implementations herein would not exist without computers or networks.

Notably, the embodiments herein improve upon device authentication techniques by replacing userid/password authentication with more secure device-level authentication. Therefore, in addition to improving the operations of computer technologies, the embodiments herein also improve the operation of network security technologies. The overall effect of the transactions described above overrides the routine and conventional sequence of events ordinarily used to remotely access protected information on a server device.

As a result, these embodiments go beyond merely automating a known manual procedure or implementing an otherwise-disembodied method on a general purpose computer. Instead, a new mechanism for device-level authentication and security is provided, this mechanism involving at least a client device in communication with a server device. Further, the client device uses a secure memory element, as opposed to general hardware, to store an assigned unique client device identifier. Moreover, the embodiments herein describe specific types of device-level authentication transactions, and do not seek to preempt all modes of authentication.

5. Further Embodiments

The following further embodiments may be implemented as part of any of the features described above. Particularly, these embodiments may modify one or more of the message flow diagrams of FIGS. 5A, 5B, and 5C, as well as the flow charts of FIGS. 6 and 7.

A. Requiring Explicit Permission for Client-Initiated Transactions

Some embodiments above involve establishing a secure connection between a client device and a provisioning server device, or between a client device and a pre-validated server device. These connections may be initiated by the client device—that is, the first message in the establishment of the connection may be transmitted by the client device to the respective server device. In some scenarios, such transactions may pose a security risk. For instance, if a number of client devices are compromised, they may be instructed to repeatedly attempt to establish secure connections with server devices. Doing so may amount to a denial of service (DOS) attack in which hundreds or thousands of client devices overload server devices with such requests, thereby rendering the server devices unable to process legitimate transactions.

In order to mitigate this problem, client devices may be prevented from initiating connections with at least some server devices unless the client devices are specifically granted permission to do so. For example, as part of the registration procedure between a client device and the provisioning server device, the provisioning server device may inform the pre-validated server devices of an address (e.g., an IP address) at which the client device can be reached. A pre-validated server device (or the provisioning server device operating on behalf of the pre-validated server device) may transmit a message to the client device, indicating that the client device is permitted to contact one or more of the pre-validated server devices. The client device may wait until it receives such an indication before attempting to establish a secure connection with any of the pre-validated server devices. In the context of FIG. 5C, step 540 might not take place until the client device receives an indication that establishing the secure connection is permitted.

In this way, if the client device is compromised, the damage that it can do will be limited. Server devices may ignore any requests or attempts to establish connections (secure or otherwise) from a client device until that client device has been granted permission to do so. Thus, server resources are not dedicated to undertaking cryptographic activities upon mere client device request. Instead, the server devices can manage their loads by granting various client devices permission to communicate with them when these server devices determine that they have the appropriate computational resources available.

Furthermore, each message transmitted by a server device to a client device granting communication may include a time frame in which the communication may take place. For example, the time frame may specify a time period in the future (e.g., Tuesday, Mar. 7, 2017 between 2 pm and 2:15 pm GMT) or may be a time that begins at the time of message transmission (e.g., the client device receiving the message will be given 15 minutes in which to communicate, starting immediately). Other variations are possible.

B. Limiting Client-Initiated Transactions

In an alternative embodiment, each client device may be granted a limited number of tokens (e.g., 100) to use over a specific period of time (e.g., 24 hours) in order to establish secure connections with server devices. Each token may be, for instance, an alphanumeric string that is numbered sequentially (e.g., token1, token2, token100, etc.) or otherwise uniquely identifiable. A client device may be required to transmit such a token during establishment of a secure connection with a server device. Once a particular token is used in this manner, it cannot be used again during the specific period of time. If a client device attempts to reuse a token during the specific period of time, the server device that receives the reused token may ignore the connection establishment attempt from the client device.

This mechanism provides a more flexible approach for DOS mitigation. Explicit permission for client devices to communicate is not required. While a client device might be able to transmit its quota of tokens within a short period of time, the extent of this quota is limited and server devices may ignore any further communication attempts from the client device until the next time period. Thus, even if a client device is comprised, its ability to contribute to a DOS attack is minimal.

Furthermore, either integrated with this embodiment or as a standalone feature, a client device may be configured so that it will always wait at least n seconds between any two consecutive communication attempts. Likewise, a server device may be configured so that it will not accept further communication attempts from a client device that has successfully made a communication attempt within the last n seconds.

C. Hardcoded Restrictions on Client-Initiated Transactions

Either of the two methods described in the subsections above, requiring explicit permission for client-initiated transactions and limiting client-initiated transactions, may be enforced by hardcoding the software that performs these functions into the client device. For example, the client device may include a protected memory associated with its communication interface that forces the client device to adhere to either of the techniques described above.

The protected memory may be any sort of hardware security module, secure integrated circuit, protected memory unit, or protected memory area of a memory or microcontroller chip. In some cases, the protected memory may be write-once, in that the memory is locked after initially being written, or the protected memory might allow multiple writes but only with use of a cryptographic key. The manufacturer of the client device may provision the protected memory with the appropriate code to restrict client-initiated transactions. Thus, once the client device is in the field, merely updating the client device's software or firmware might not change the contents of the protected memory. As a result, it may be difficult for client devices to be compromised for use in various types of undesirable activities (e.g., DOS attacks).

6. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:

transmitting, by a client device, a manufacturer security certificate to a provisioning server device, wherein the manufacturer security certificate is associated with a manufacturer of the client device;

establishing, between the client device and the provisioning server device, a secure connection, wherein the secure connection is established based on the manufacturer security certificate;

receiving, by the client device over the secure connection, a server security certificate, wherein the server security certificate identifies secure communication parameters of a pre-validated server device, wherein the pre-validated server device is not the provisioning server device;

obtaining, by the client device, a unique client device identifier, wherein the unique client device identifier is configured to support secure access to the pre-validated server device; and based on the unique client device identifier, accessing, by the client device, protected information available to the pre-validated server device, wherein accessing the protected information occurs without the client device transmitting security credentials that identify a user of the client device to the pre-validated server device, wherein the client device stores a plurality of unique tokens, each token limited to use once per an epoch defined by a pre-established number of seconds, and wherein accessing the protected information comprises transmitting a message to establish a second secure connection with the pre-validated server device, wherein the message contains a particular token, from the plurality of unique tokens, that has not been used in a current epoch.

2. The method of claim 1, wherein the accessing the protected information comprises (i) establishing, between the client device and the pre-validated server device, a second secure connection, wherein the second secure connection is established based on the server security certificate, (ii) after establishing the second secure connection, transmitting, by the client device over the second secure connection, a representation of the unique client device identifier, and (iii) receiving, by the client device over the second secure connection, the protected information, wherein the second secure connection involves mutual authentication between the client device and the pre-validated server device.

3. The method of claim 1, further comprising:
transmitting, by the client device over the secure connection, device data that characterizes the client device.

4. The method of claim 3, wherein the device data comprises at least one of a manufacturer identity of the client device, a type of the client device, a model number of the client device, a serial number of the client device.

5. The method of claim 4, wherein reception of the device data by the provisioning server device causes the provisioning server device to look up the device data in a device database, and verify that the device data is consistent with known devices.

6. The method of claim 1, wherein at least one of the secure connection or the second secure connection is established, at least in part, by a web browser application operating on the client device.

7. The method of claim 1, wherein the secure connection is based on Secure Sockets Layer (SSL) or Transport Layer Security (TLS) protocols.

8. The method of claim 1, wherein, prior to transmitting the manufacturer security certificate to the provisioning server device, the client device has not communicated with the provisioning server device or the pre-validated server device.

9. The method of claim 1 further comprising:
in response to receiving the server security certificate, validating, by the client device, the server security certificate.

10. The method of claim 1, wherein accessing the protected information available to the pre-validated server device comprises:
receiving, from the pre-validated server device, an indication that the client device is permitted to establish a second secure connection with the pre-validated server device; and
in response to receiving the indication, establishing the second secure connection with the pre-validated server device.

11. The method of claim 1, wherein obtaining the unique client device identifier comprises receiving the unique client device identifier from the provisioning server device.

12. An article of manufacture including a non-transitory computer-readable medium, having stored thereon program instructions that, upon execution by a client device, cause the client device to perform operations comprising:

transmitting a manufacturer security certificate to a provisioning server device, wherein the manufacturer security certificate is associated with a manufacturer of the client device;
establishing, between the client device and the provisioning server device, a secure connection, wherein the secure connection is established based on the manufacturer security certificate;
receiving, over the secure connection, a server security certificate, wherein the server security certificate identifies secure communication parameters of a pre-validated server device, wherein the pre-validated server device is not the provisioning server device;
obtaining a unique client device identifier, wherein the unique client device identifier is configured to support secure access to the pre-validated server device; and
based on the unique client device identifier, accessing protected information available to the pre-validated server device, wherein accessing the protected information occurs without the client device transmitting security credentials that identify a user of the client device to the pre-validated server device, wherein the client device stores a plurality of unique tokens, each token limited to use once per an epoch defined by a pre-established number of seconds, and wherein accessing the protected information comprises transmitting a message to establish a second secure connection with the pre-validated server device, wherein the message contains a particular token, from the plurality of unique tokens, that has not been used in a current epoch.

13. The article of manufacture claim 12, wherein the accessing the protected information comprises (i) establishing, between the client device and the pre-validated server device, a second secure connection, wherein the second secure connection is established based on the server security certificate, (ii) after establishing the second secure connection, transmitting, by the client device over the second secure connection, a representation of the unique client device identifier, and (iii) receiving, by the client device over the second secure connection, the protected information, wherein the second secure connection involves mutual authentication between the client device and the pre-validated server device.

14. The article of manufacture claim 12, the operations further comprising:
transmitting, over the secure connection, device data that characterizes the client device.

15. The article of manufacture claim 14, wherein the device data comprises at least one of a manufacturer identity of the client device, a type of the client device, a model number of the client device, a serial number of the client device.

16. The article of manufacture claim 15, wherein reception of the device data by the provisioning server device causes the provisioning server device to look up the device data in a device database, and verify that the device data is consistent with known devices.

17. The article of manufacture claim 12, wherein at least one of the secure connection or the second secure connection is established, at least in part, by a web browser application operating on the client device.

18. The article of manufacture claim 12, wherein, prior to transmitting the manufacturer security certificate to the provisioning server device, the client device has not communicated with the provisioning server device or the pre-validated server device.

19. A client device comprising:
a processor;
memory; and
program instructions, stored in the memory, that upon execution by the processor cause the client device to perform operations comprising:
- transmitting a manufacturer security certificate to a provisioning server device, wherein the manufacturer security certificate is associated with a manufacturer of the client device;
- establishing, between the client device and the provisioning server device, a secure connection, wherein the secure connection is established based on the manufacturer security certificate;
- receiving, over the secure connection, a server security certificate, wherein the server security certificate identifies secure communication parameters of a pre-validated server device, wherein the pre-validated server device is not the provisioning server device;
- obtaining a unique client device identifier, wherein the unique client device identifier is configured to support secure access to the pre-validated server device; and
- based on the unique client device identifier, accessing protected information available to the pre-validated server device, wherein accessing the protected information occurs without the client device transmitting security credentials that identify a user of the client device to the pre-validated server device, wherein the client device stores a plurality of unique tokens, each token limited to use once per an epoch defined by a pre-established number of seconds, and wherein accessing the protected information comprises transmitting a message to establish a second secure connection with the pre-validated server device, wherein the message contains a particular token, from the plurality of unique tokens, that has not been used in a current epoch.

* * * * *